Feb. 20, 1968     I. L. WILCOX     3,369,726
CONTAINER

Filed March 4, 1966

INVENTOR
I. L. WILCOX

BY *Young & Quigg*

ATTORNEYS

Feb. 20, 1968     I. L. WILCOX     3,369,726

CONTAINER

Filed March 4, 1966     3 Sheets-Sheet 2

INVENTOR
I. L. WILCOX

BY *Young & Quigg*
ATTORNEYS

Feb. 20, 1968  I. L. WILCOX  3,369,726
CONTAINER

Filed March 4, 1966  3 Sheets-Sheet 3

INVENTOR
I. L. WILCOX
BY *Young & Quigg*
ATTORNEYS

United States Patent Office 3,369,726
Patented Feb. 20, 1968

3,369,726
CONTAINER
Isaac L. Wilcox, Fulton, N.Y., assignor to Phillips Petroleum Company, a corporation of Delaware
Filed Mar. 4, 1966, Ser. No. 531,941
7 Claims. (Cl. 229—5.5)

ABSTRACT OF THE DISCLOSURE

A container is comprised of a circular wall member, which is crimped inwardly at the bottom to form a radial flange, and a bottom disc, which is placed in contact with the upper surface of the flange within the hollow of the wall member. The radial flange and the bottom disc are coated with a heat sealable thermoplastic material to allow bonding. A gutter is formed in the outer portion of the bottom disc, with the width of the gutter being less than the width of the flange. The flange is crushed in a continuous annular area located to the inside of the gutter to form a liquid tight seal between the flange and the bottom disc and to recess the inner edge of the flange with respect to the bottom of the gutter portion of the flange. Various cover members, for example, a film of heat sealable thermoplastic material which is heat sealed to the top rim of the container, can be used.

Background of the invention

This invention relates to a novel container structure. In one aspect the invention relates to containers of circular cross section formed of paperboard or the like coated on at least one side with a heat sealable thermoplastic material. In one specific aspect the invention relates to containers wherein the bottom construction comprises a disc member heat sealed by means of the heat sealable thermoplastic coating to an inwardly directed flange formed from the wall member.

In the past such containers have been formed from uncoated paperboard through the utilization of glue to seal the bottom disc member and the wall member together. The formation of the flange by crimping the lower portion of the wall inwardly resulted in numerous fold lines in the flange extending approximately radially in the plane of the flange. The glue or adhesive utilized was one which would flow under the heat and/or pressure of the sealing operation and was applied in sufficient quantity to fill each of the fold lines in the flange and thus provide a liquid tight seal. However, in containers formed with paperboard or the like coated on at least one side with a heat sealable thermoplastic material, the thermoplastic coating does not flow significantly under the heat and pressure of the sealing operation and is not utilized in an amount sufficient to fill the fold lines in the flange. Although structural bonding of the disc to the flange was effected, the resulting containers were subject to leaking even when bonded under relatively high pressures.

I have discovered that these difficulties can be overcome by providing a low pressure structural bond between the flange and the disc and additionally providing a high pressure liquid tight seal in the shape of an annular whose radial dimension is relatively small with respect to the radial dimension of the structural bond.

I have further found that the bottom structure is improved by forming an upwardly opening gutter in the peripheral area of the disc, the radius of the inner edge of the gutter being greater than the radius of the high pressure seal such that the high pressure seal is closely adjacent to the inner edge of the gutter.

I have also found that the bottom structure can be improved by having the radial length of the flange such that the high pressure seal is adjacent to the inner edge of the flange.

Accordingly, it is an object of the invention to provide an improved leak-proof container of simple construction. It is an object of the invention to provide a simple container of paperboard or the like coated on at least one side with a thermoplastic material. It is a further object of the invention to provide a container having an improved bottom structure. Other objects, aspects and advantages of the invention will be apparent from a study of the disclosure, the drawings and the appended claims to the invention.

Description of the preferred embodiment

Figure 2:
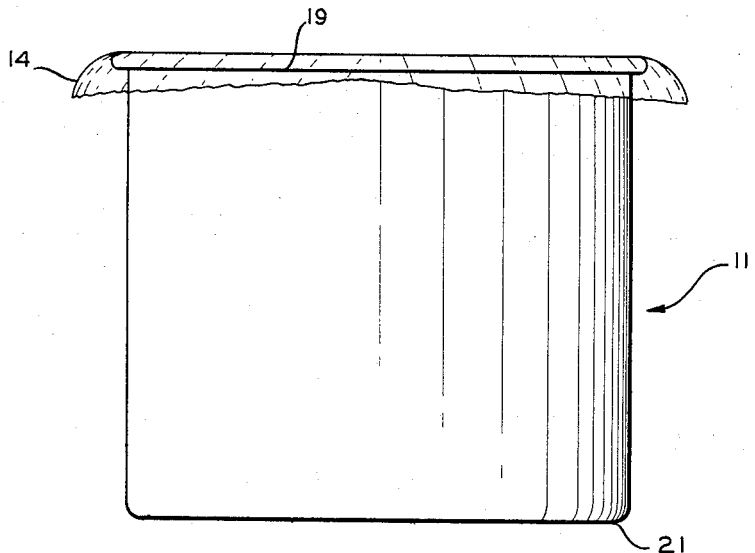
FIGURE 2 is an elevation view of the resulting completed container.
Figure 1:
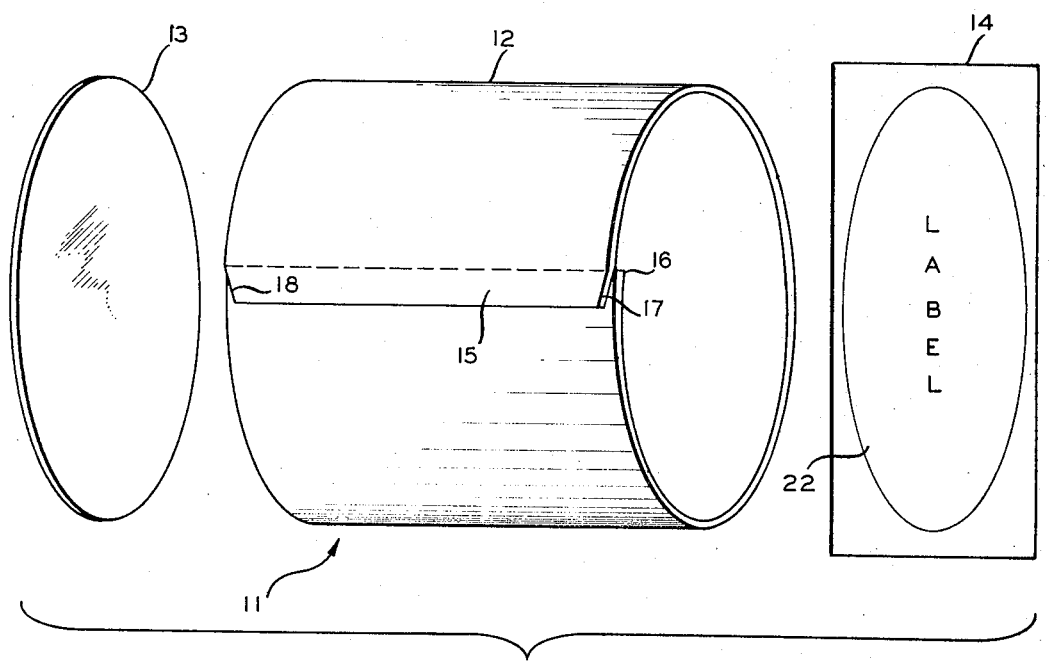
FIGURE 1 is a perspective view of a wall member, a bottom disc and a cover before the container is formed.
Figure 5:
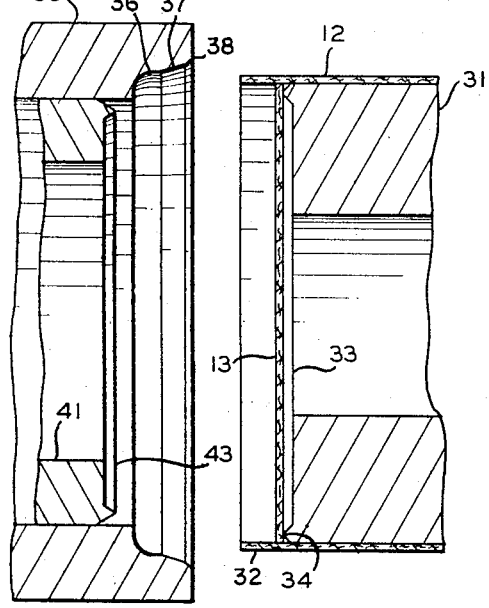
FIGURES 5 and 6 are cross sectional views of the flanging and sealing dies at the start and completion, respectively, of the operation of forming the bottom structure of the container of FIGURE 3.

Referring now to FIGURE 1, the container 11 is formed from a wall member 12, a bottom disc 13 and a cover 14. Wall member 12 is preferably formed from a flat blank by feeding the flat blank to a winding mandrel where the blank is shaped into a cylinder with ends 15 and 16 overlapping to form a vertical seam under the heat and pressure applied to the seam. End 15 preferably has notches 17 and 18 cut in the corners thereof to facilitate the rolling of the upper edge of the wall member 12 to form a rolled rim 19 and the crimping of the lower edge of wall member 12 to form the inwardly directed flange 21 (FIGURE 2). While the invention will be described in terms of wall member 12 being in the form of a right angle cylinder, it is within the scope of the invention to use wall members which are in the form of a truncated cone, with the taper of the wall from the bottom to the top being either inward or outward with respect to the axis of the cone. Rolled rim 19 can be formed by any conventional method known in the art. Cover 14 is illustrated as a film of thermoplastic material having a label 22 or other decoration printed thereon. Cover 14 is heat sealed to rim 19 to form a liquid tight container. While cover 14 can be heat sealed tangentially to the upper surface of rim 19, it is presently preferred that the heat seal extend outwardly and downwardly for at least one eighth of the circumference of the rim. While cover 14 has been illustrated as a square sheet of film, other shapes, such as circular, triangular, oval and rectangular can be utilized.

Figure 6:
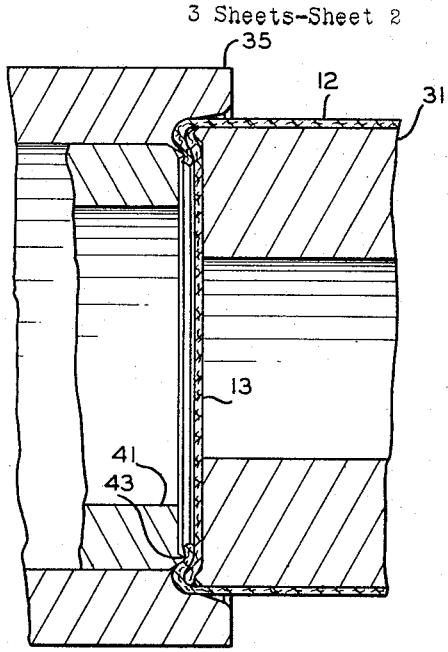
Figure 3:
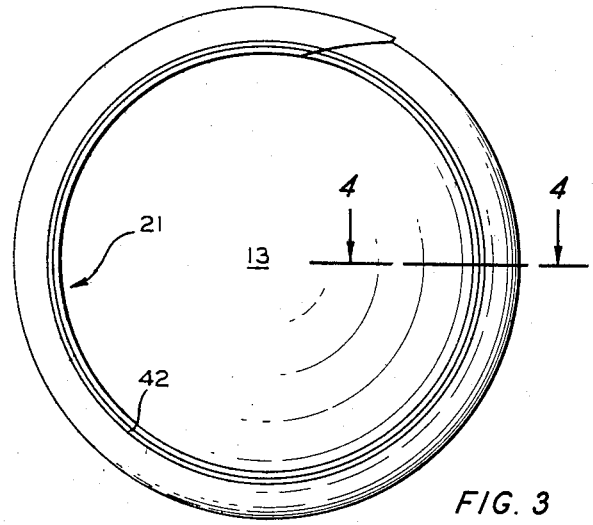
FIGURE 3 is a bottom view of the container of FIGURE 2 in accordance with the presently preferred embodiment of the invention.
Figure 4:
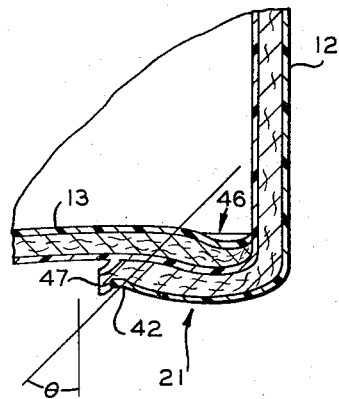
FIGURE 4 is a partial elevation view in cross section of the bottom structure of the container of FIGURE 3.
Figure 9:
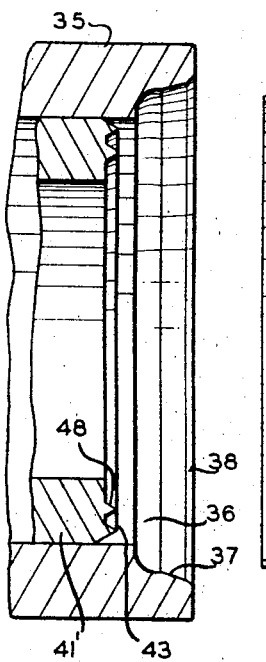
FIGURES 9 and 10 are cross sectional views of the flanging and sealing dies at the start and completion, respectively, of the operation of forming the bottom structure of the container of FIGURE 7.
Figure 10:
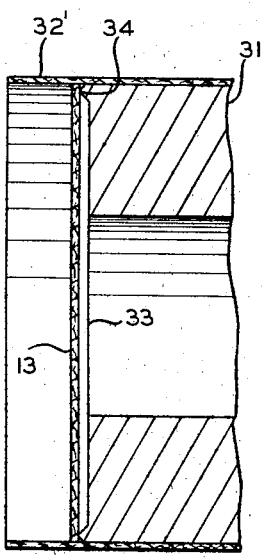
Figure 10:
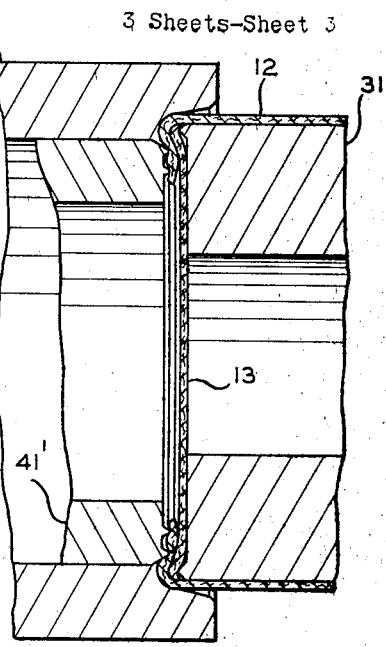
Figure 7:
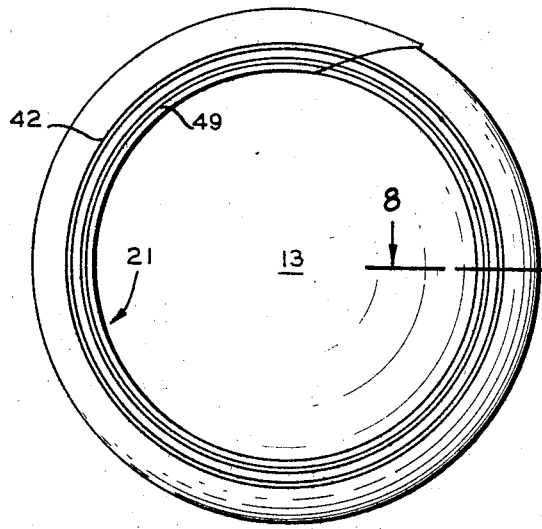
FIGURE 7 is a bottom view of the container of FIGURE 2 in accordance with another embodiment of the invention.
Figure 8:
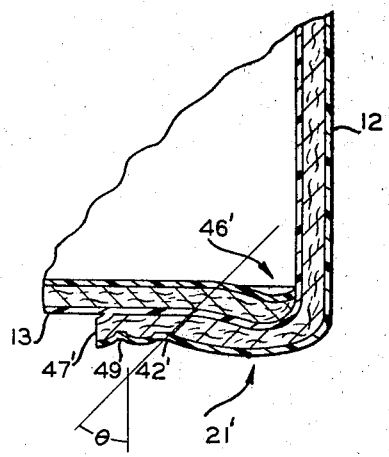
FIGURE 8 is a partial elevation view in cross section of the bottom structure of the container of FIGURE 7.

Referring now to FIGURES 3 through 6, the presently preferred bottom structure is formed by placing wall member 12 around mandrel 31 (which may also be the mandrel for forming the flat blank into the cylindrical shape). The lower end portion 32 of wall member 12 extends beyond the end 33 of mandrel 31. End 33 of mandrel 31 is flat except for a continuous annular ridge 34 disposed at the periphery of end 33. Bottom disc 13 is placed inside portion 32 and against ridge 34. Relative movement between mandrel 31 and cooperating hollow folding sleeve 35 is then effected. The end of sleeve 35 facing end 33 of mandrel 31 has an annular groove 36 in the inner edge thereof. The outer diameter of groove 36 is equal to the outer diameter of wall member 12. Sleeve 35 is positioned with groove 36 being coaxial with mandrel 31. Sleeve 35 can be provided with sloping surfaces 37 and 38 which act as centering means to guide portion 32 of wall member 12 into groove 36. The relative movement of mandrel 31 toward sleeve 35 causes portion 32 to enter groove 36 and be crimped inwardly to form flange 21. After flange 21 has been formed substantially perpendicularly to the axis of the container, a sealing ram 41, positioned within hollow sleeve 35, is moved against flange 21 to effect the high pressure seal 42 by means of a continuous annular ridge 43. While mandrel 31, sleeve 35 and ram 41 could be heated to provide the heat for raising the temperature of the thermoplastic coatings to bonding temperature, it is highly preferable to use external means to preheat the inside surface of portion 32 and the bottom surface of disc 13. It is often desirable to cool mandrel 31, sleeve 35 and/or ram 41. Where the container is coated with thermoplastic material on only one side, it is necessary for at least one of flange 21 and disc 13 to have its coatings in the area of contact of flange 21 and disc 13. However, it is generally preferable for the container to have a coating of thermoplastic material on both sides of the paperboard or the like material. The crimping of portion 32 by impingement upon groove 36 is sufficient to bring the inner surface of portion 32 into contact with the bottom surface of disc 13 to effect a structural bond, but not a leakproof seal. The width or radial dimension, with respect to the axis of the container, of ridge 43 is sufficiently narrow, with respect to the width of flange 21, to permit a leak-proof seal through the high pressure crushing of the fold lines confronting ridge 43. The ratio of the radial dimension of the high pressure seal 42 to the radial dimension of the low structural bond of flange 21 will vary with the type of material, thickness of material, size of container, and the like, but will generally be in the range of 0.02 to 0.2, and preferably in the range of 0.05 to 0.15. Ridge 43 has a smaller diameter, with respect to the axis of container 11, than ridge 34 but is sufficiently close thereto to force the inner portion of flange 21 and the center portion of disc 13 against the flat face of mandrel 31, as shown in FIGURE 6. This coaction of ridges 34 and 43 results in the formation of an upwardly opening continuous annular gutter 46 in disc 13 adjacent the periphery of disc 13 and in the adjacent portion of flange 21. Upwardly opening gutter 46 provides for greater strength in the bottom construction than would be obtained by an L-shaped joint, and also provides a stable container when the container is placed on a surface in an upright position despite minor variations in the downward bulge of the center of disc 13.

While the spacing of the gutter 46 and the high pressure seal 42 can vary with the particular container, the angle, $\theta$, of the line between the outer edge of the high pressure seal 42 and the inner edge of the gutter 46, with respect to the vertical, will generally be in the range of 30° to 60° and preferably will be approximately 45°. In order to prevent a free edge or flare, flange 21 is of such a radial dimension that its inner edge 47 is located closely adjacent to seal 42. The radial dimension, with respect to the axis of container 11, of flange 21 is desirably short in order to minimize the size of the radial fold lines.

Referring now to FIGURES 7 through 10, there is disclosed a modification of the container of FIGURES 3–6 with the same elements being identified by the same numerals and modified elements by primed numerals. In this embodiment portion 32' is longer than portion 32 to provide a flange 21' having a greater radial dimension than flange 21. Sealing ram 41' is modified by adding a second annular ridge 48, concentric to but of smaller diameter than ridge 43. Ridge 48 is positioned to provide a high pressure bond 49 closely adjacent to the inner edge 47' of flange 21'. Where two or more annular ridges are utilized on ram 41', at least one of the ridges is continuous to provide the liquid tight seal. The ratio of the sum of the radial dimensions of seals 42' and 49 to the radial dimension of flange 21' will generally be in the range of 0.02 to 0.2 and preferably in the range of 0.05 to 0.15. The relationship of seal 42' and gutter 46' will be the same as for the container of FIGURES 3–6.

Reasonable variations and modifications are possible within the scope of the foregoing disclosure, the drawings and the appended claims to the invention.

I claim:

1. A container comprising a wall member of circular cross section of paperboard or the like having a lower portion thereof crimped inwardly to form an inwardly directed radial flange, said flange having fold lines therein, a bottom circular disc positioned within the hollow of said wall member and in contact with the upper surface of said flange, at least one of the upper surface of said flange and the portion of the lower surface of said bottom disc which contacts said upper surface of said flange having a coating of a heat sealable thermoplastic material, said disc being structurally bonded to said flange throughout the area of contact by means of said coating of a heat sealable thermoplastic material, a continuous annular area of said flange being crushed to collapse said fold lines in said area to form a liquid tight seal between said annular area of said flange and the adjacent portion of said disc by means of said coating of heat sealable thermoplastic material, said coating of heat sealable thermoplastic material being of insufficient thickness and fluidity under the structural bonding conditions to fill the fold lines in said flange outside of said annular area to the extent required to provide a liquid tight seal, an upwardly opening continuous annular gutter being formed in the peripheral portion of said disc and in the adjacent portion of said flange, the radial dimension with respect to the axis of said container of said gutter being less than the radial dimension of said flange, the outer diameter with respect to the axis of said container of said annular area of said flange being less than the inner diameter of said gutter.

2. A container in accordance with claim 1 wherein the ratio of the radial dimension with respect to the axis of said container of said annular area to the radial dimension of said flange is in the range of 0.02 to 0.2.

3. A container in accordance with claim 1 wherein said annular area of said flange is closely adjacent the inner edge of said flange to prevent the inner edge of said flange from flaring away from said disc.

4. A container in accordance with claim 1 wherein the angle with respect of the vertical of a line between the inner edge of said gutter and the outer edge of said annular area is in the range of 30° to 60°.

5. A container in accordance with claim 4 wherein the angle with respect of the vertical of a line between the inner edge of said gutter and the outer edge of said annular area is in the range of 30° to 60°.

6. A container in accordance with claim 4 further comprising a second annular continuous area of said flange being crushed to collapse said fold lines in said second area to form a second liquid tight seal to said disc, said second annular area having a diameter with respect to the axis of said container smaller than the diameter of the first mentioned annular area and only slightly greater than the diameter of the inner edge of said flange.

7. A container in accordance with claim 1 wherein said wall member and said disc are coated on both sides with a heat sealable thermoplastic material, and wherein the upper edge of said wall member is rolled outwardly and downwardly to form a rolled rim, and further comprising a cover member of a film of a heat sealable thermoplastic material heat sealed to said rim.

References Cited
UNITED STATES PATENTS

| | | | |
|---|---|---|---|
| 1,498,909 | 6/1924 | Grimm | 229—5.5 |
| 2,032,815 | 3/1936 | Shuey | 229—5.5 |
| 2,060,781 | 11/1936 | Annen | 229—5.5 X |
| 2,172,179 | 9/1939 | Rutledge | 229—5.5 |
| 2,969,901 | 1/1961 | Behrens | 229—5.5 X |

DAVIS T. MOOREHEAD, *Primary Examiner.*

UNITED STATES PATENT OFFICE
CERTIFICATE OF CORRECTION

Patent No. 3,369,726                                      February 20, 1968

Isaac L. Wilcox

It is certified that error appears in the above identified patent and that said Letters Patent are hereby corrected as shown below:

Column 4, line 74, the claim reference numeral "4" should read -- 3 --.

Signed and sealed this 31st day of March 1970.

(SEAL)
Attest:

Edward M. Fletcher, Jr.                        WILLIAM E. SCHUYLER, JR.
Attesting Officer                                    Commissioner of Patents